(12) United States Patent
Khan et al.

(10) Patent No.: US 8,260,930 B2
(45) Date of Patent: Sep. 4, 2012

(54) SYSTEMS, METHODS AND COMPUTER READABLE MEDIA FOR REPORTING AVAILABILITY STATUS OF RESOURCES ASSOCIATED WITH A NETWORK

(75) Inventors: Arshad Khan, Austin, TX (US); Chaoxin Qiu, Austin, TX (US); Niral Sheth, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 256 days.

(21) Appl. No.: 12/632,179

(22) Filed: Dec. 7, 2009

(65) Prior Publication Data
US 2011/0138053 A1 Jun. 9, 2011

(51) Int. Cl.
*G06F 15/173* (2006.01)
*G06F 15/16* (2006.01)
(52) U.S. Cl. ................... 709/226; 709/227
(58) Field of Classification Search ........... 709/226
See application file for complete search history.

(56) References Cited

U.S. PATENT DOCUMENTS

| | | | |
|---|---|---|---|
| 5,774,660 A * | 6/1998 | Brendel et al. | 709/201 |
| 6,615,265 B1 * | 9/2003 | Leymann et al. | 709/227 |
| 7,669,029 B1 * | 2/2010 | Mishra et al. | 711/170 |
| 2006/0150028 A1 * | 7/2006 | Blaisdell et al. | 714/39 |
| 2006/0193259 A1 * | 8/2006 | Sanchez Cembellin et al. | 370/235 |
| 2007/0237139 A1 * | 10/2007 | Garcia-Martin et al. | 370/389 |
| 2009/0293123 A1 * | 11/2009 | Jackson et al. | 726/23 |
| 2010/0157980 A1 * | 6/2010 | Ellsworth et al. | 370/352 |
| 2011/0040840 A1 * | 2/2011 | Addante et al. | 709/206 |

* cited by examiner

*Primary Examiner* — Firmin Backer
*Assistant Examiner* — James Edwards
(74) *Attorney, Agent, or Firm* — Hope Baldauff Hartman, LLC

(57) ABSTRACT

Methods, systems, and computer-readable media for reporting an availability status of resources associated with a server in a network in a network are described. According to one aspect, a computer-implemented method of reporting an availability status of resources associated with a server in a network includes determining the availability status of resources associated with the server. The availability status of resources is then inserted into a resource availability status header of a message. The message including the availability status of resources associated with the server is then sent.

11 Claims, 5 Drawing Sheets

SYSTEMS, METHODS AND COMPUTER READABLE MEDIA FOR REPORTING AVAILABILITY STATUS OF RESOURCES ASSOCIATED WITH A NETWORK

BACKGROUND

Exemplary embodiments are related to resource availability in a network. More particularly, exemplary embodiments relate to reporting availability status of resources associated with a network.

Typical application servers may include a front end resource controller with a set of resources at the back end. These application servers can co-exist with various capacities of resources behind each controller. The variation of the capacity of the resources behind each controller may be due to the evolution of the product or due to the depletion of a particular server, such as when some resource hardware or software instances are experiencing a fault condition or are offline. During the continuing operation of the computer network, the capacity of these resources may be dynamically changing for various reasons, such as hardware or software faults.

In existing networks, client applications request particular services from available application servers typically using Session Initiation Protocol (SIP). However, in existing networks, client applications do not dynamically adjust their request distribution across all available servers depending upon the available resource capacities of the application servers. This may lead to delays in processing requests from clients due to overloaded application servers as well as an unbalanced load distribution amongst the available application servers.

Prior attempts to address these problems have been met with limited success. Some client applications may employ the use of load balancers to balance the load of the application servers. These load balancers may watch the availability of the servers using heartbeat methods. The load balancers may then utilize some algorithm, such as round-robin or weighted round-robin, to distribute requests from client applications among available application servers. However, these load balancers do not have a view of the dynamic changes of resource availability of the application servers behind the controller, resulting in overloading the remaining available application servers and creating delays and errors.

SUMMARY

Embodiments of the disclosure presented herein include methods, systems, and computer-readable media for reporting an availability status of resources associated with a server in a network. According to one aspect, a computer-implemented method of reporting an availability status of resources associated with a server in a network includes determining the availability status of resources associated with the server. The availability status of resources is then inserted into a resource availability status header of a message. The message including the availability status of resources associated with the server is then sent.

According to another aspect, a system for reporting an availability status of resources associated with a server in a network includes determining the availability status of resources associated with the server. The availability status of resources is then inserted into a resource availability status header of a message. The message including the availability status of resources associated with the server is then sent.

According to yet another aspect, a computer-readable medium for reporting an availability status of resources associated with a server in a network includes determining the availability status of resources associated with the server. The availability status of resources is then inserted into a resource availability status header of a message. The message including the availability status of resources associated with the server is then sent.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
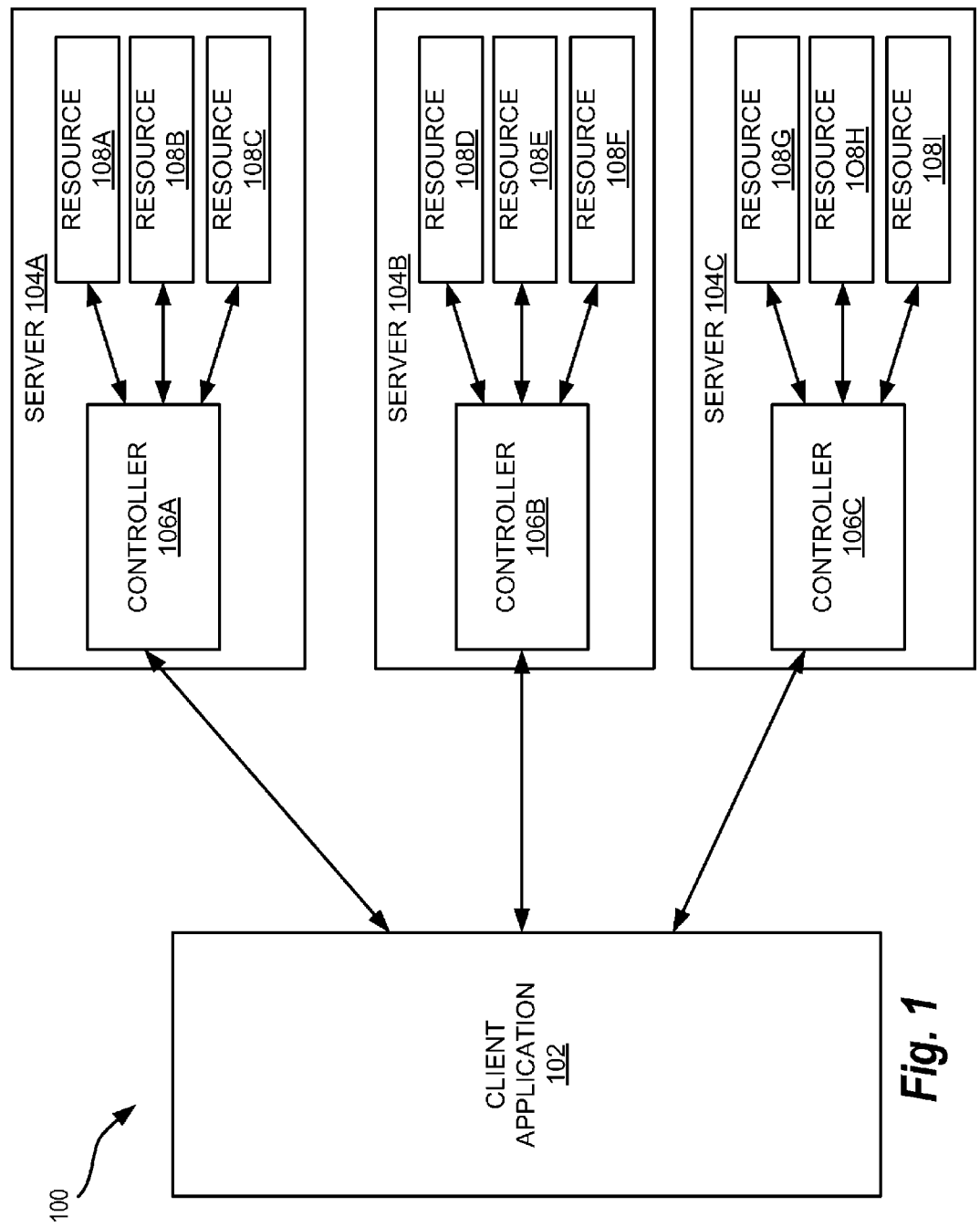
FIG. 1 illustrates a network architecture including a client application in communication with a set of application servers, according to various embodiments.

The following detailed description is directed to methods, systems, and computer-readable media for reporting an availability status of resources associated with servers in a network utilizing application layer messaging. Through the implementation of the present disclosure, each server in a network may provide a fine grain resource availability view of the resources associated with the server by sending the status of the resources to a client application via application layer messaging. By doing so, the client application may intelligently distribute traffic to the set of servers according to the availability of resources associated with each of the set of servers within the network. In this way, the likelihood of problems arising due to an unbalanced load on servers is significantly reduced. Accordingly, client applications utilizing an intelligent traffic distribution approach may achieve better dynamic load balancing by automatically adapting to partial failures within a server that may deplete the available resources within a server. As a result, a network implementing the intelligent traffic distribution approach may experience less frequent and shorter delays and fewer errors.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, like numerals will represent like elements through the several figures.

FIG. 1 illustrates a network architecture including a client application 102 in communication with a set of servers 104A-104C within a network 100. The network 100 may be any communication network, such as an IP Multimedia Subsystem (IMS)-Next Generation Network (NGN). The present disclosure may be utilized in any network environment that involves a resource requester, such as the client application 102, communicating via application layer messaging with various servers, such as the set of application servers 104A-104C, to request services from resources, such as resources 108A-108I, associated with the set of application servers. For the sake of clarity and ease of understanding, the present disclosure will refer to a resource requester as a client application.

In FIG. 1, the client application 102 may communicate with the set of application servers 104A, 104B, 104C (also referred to herein generally as server 104), within the network 100. The client application 102 may be any application communicating with servers, such as the servers 104 having the resources 108A-108I. In various embodiments, the client application 102 may include a load balancer, various applications, and a session layer function such as a call session control function (CSCF), and the like. In alternative embodiments, a CSCF associated with the client application may reside external to the client application such as the embodiment shown in FIG. 2. It should be understood that communications between the client application and resource controllers associated with the server within the network may be performed via a CSCF that may be included within the client application or that may reside external to the client application. Therefore, for the sake of clarity, any references made throughout the present disclosure to the client application 102 refer generally to a client application that has a CSCF associated with the client application.

The server 104A may include a resource controller 106A that communicates with and controls the resources 108A, 108B, and 108C associated with the server 104A. Similarly, the server 104B may include a resource controller 106B that communicates with and controls the resources 108D, 108E, 108F associated with the server 104B, and the server 104C may include a resource controller 106C that communicates with and controls the resources 108G, 108H, 108I associated with the server 104C. For ease of reference, the resource controllers 106A, 106B, 106C are referred to herein generally as the resource controller 106, and resources 108A-108I are referred to herein generally as the resources 108. It should be appreciated that the resource controller 106 may control any number of the resources 108 within the associated server 104. Throughout this disclosure, functions performed by the server 104 may be performed by the resource controller 106 of the server 104.

The server 104 may communicate with the client application 102 using messages, such as Session Initiation Protocol (SIP) messages, over an application layer. In various embodiments, the message is a SIP message communicating over a SIP messaging application function. According to exemplary embodiments, the server 104 sends messages to the client application 102 including the availability status of the resources 108 within the server. Details about the messages and the resource availability status information will be described below in regard to FIGS. 3 and 4.

In various embodiments, the resource controller 106 of the server 104 may communicate directly with the client application 102 via messages that include resource availability status information of resources within the server 104. The resources 108 may be processors, memory, disk arrays, media processors, ports or any other processing component within the server 104. According to exemplary embodiments, the resources 108 are connected to the server 104 by a backplane fabric. This type of architecture is a common implementation to achieve scalability for the server 104 because the resources 108 can be added at the back end of the server, while preserving an existing front end of the server 104, such as the resource controller 106.

Figure 2:
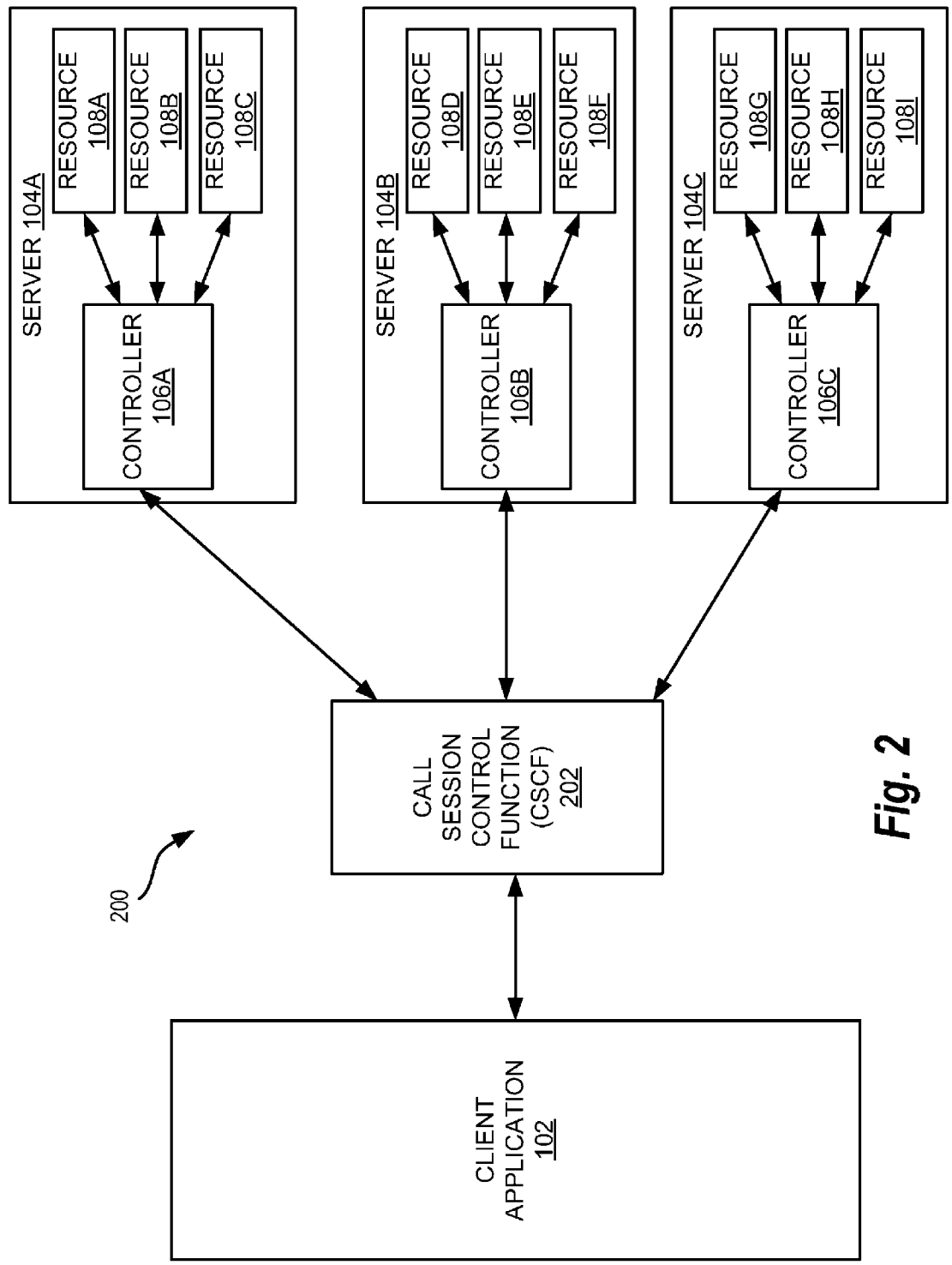
FIG. 2 illustrates a network architecture including a call session control function in communication with a set of application servers and a client application, according to various embodiments.

Referring now to FIG. 2, an embodiment of a network architecture including a call session control function (CSCF) 202 in communication with the set of application servers 104 and the client application 102 within an IMS based network 200 is shown. In existing next generation networks based on Third Generation Partnership Project (3GPP) standards, a CSCF may be configured to manage the communication sessions using SIP protocol. Client applications and the resource servers communicate via the CSCF using SIP messages when some resources are required for communication sessions.

According to the embodiment shown in FIG. 2, the client application 102 may use the SIP protocol to request particular resources from a resource server as needed by a communication session. By 3GPP standards, the client application 102 may be configured such that all such SIP messages pass through a CSCF 202 that resides external to the client application 102. In one embodiment, upon receiving the request from the client application 102 via the CSCF 202, the resource controller 106 may respond to the request by sending a SIP message including the resource availability status information of the resources 108 within a header of the SIP message, as will be described in further detail in regard to FIGS. 3 and 4.

The CSCF 202 may be configured to utilize the resource availability status information of the resources 108 sent from the resource controllers 106 to intelligently distribute the traffic from the client application 102 amongst the set of servers 104. According to embodiments presented herein, the traffic may be distributed according to an active/standby load configuration or a load sharing configuration, as will be described in further detail in regard to FIGS. 3 and 4.

Figure 3:
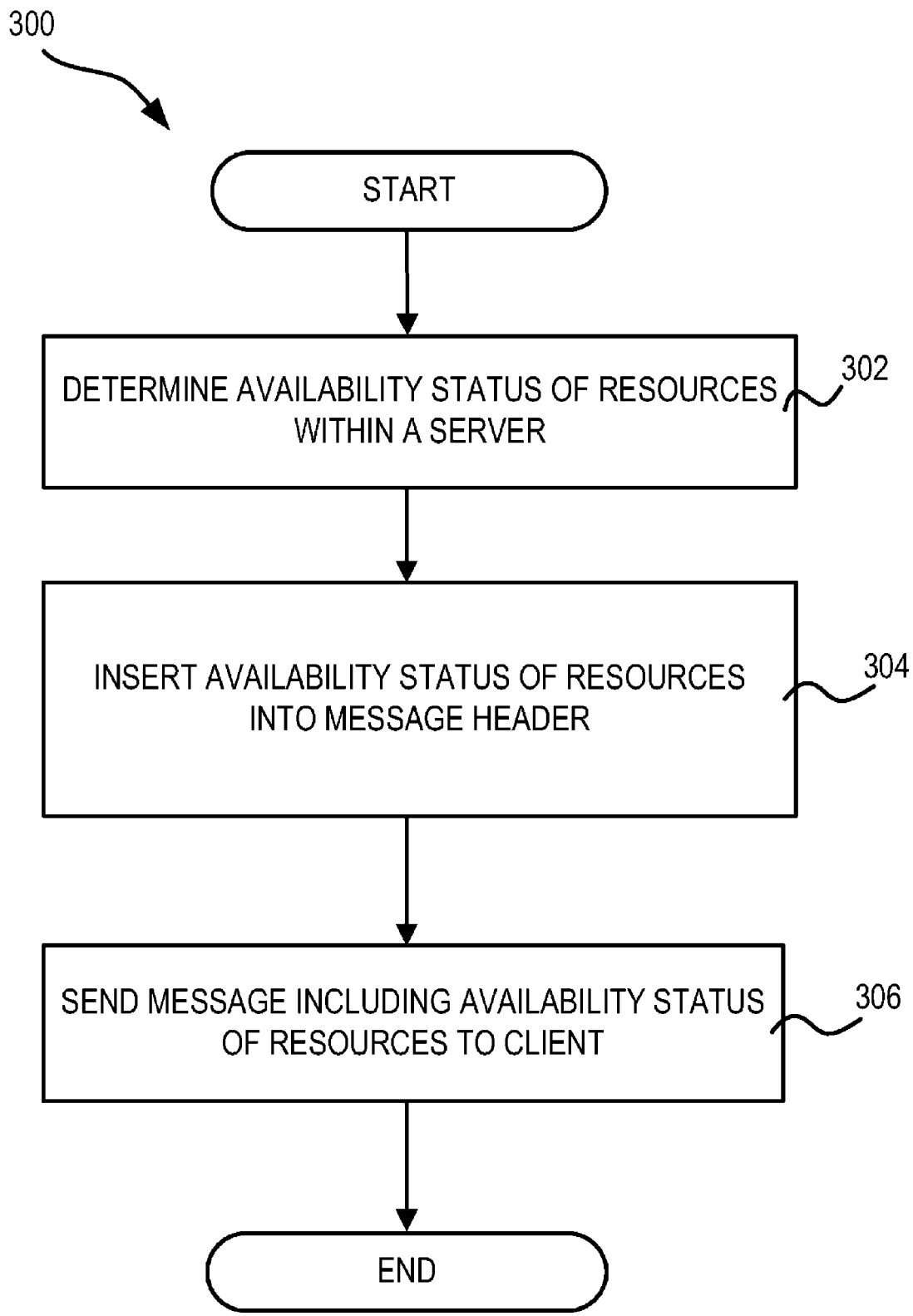
FIG. 3 is a logical flow diagram illustrating aspects of a process for reporting an availability status of resources within a server, to the client application, according to various embodiments.
Figure 4:
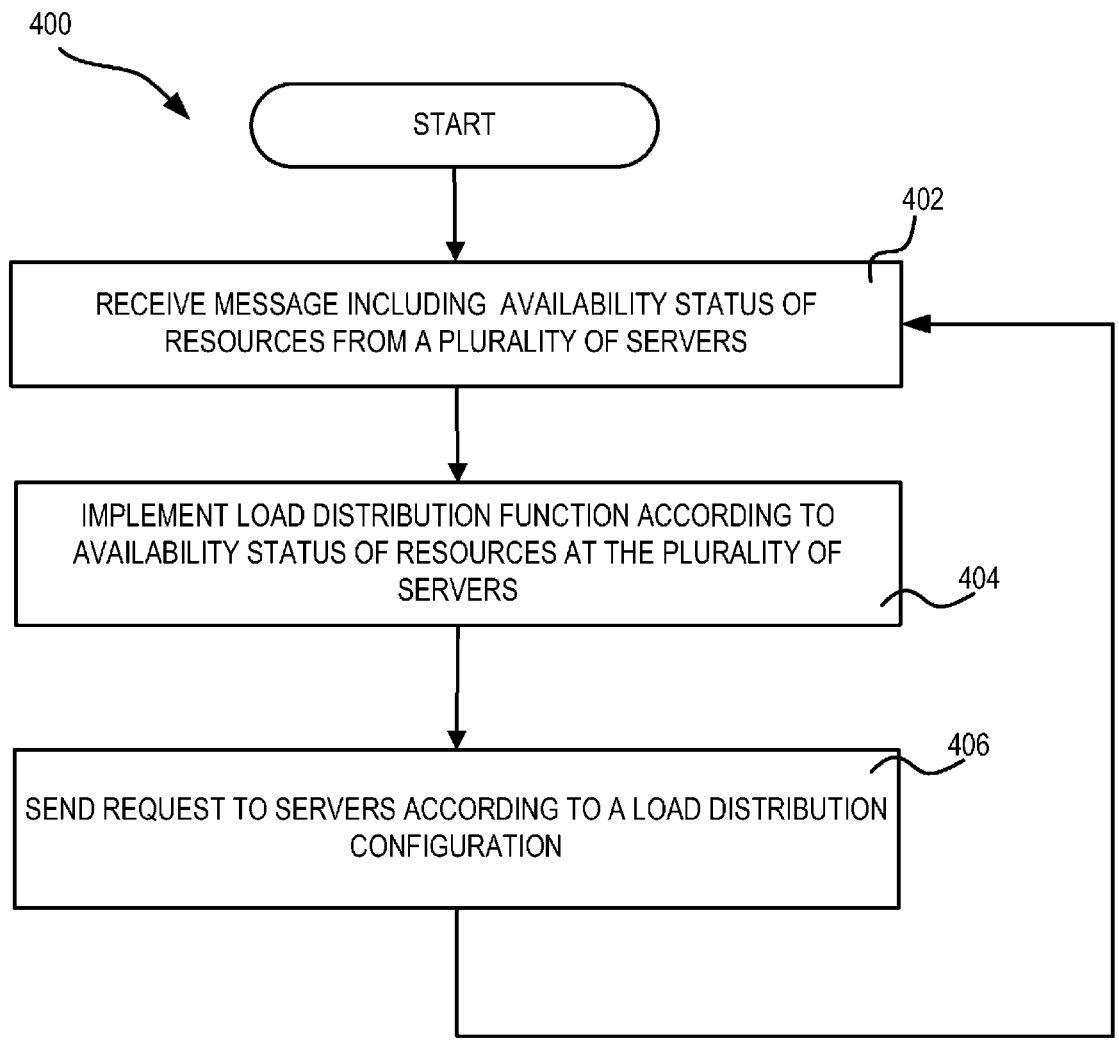
FIG. 4 is a logical flow diagram illustrating aspects of a process for automatically adjusting load distribution throughout the set of application servers, according to various embodiments.

Turning now to FIGS. 3 and 4, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein. For the sake of clarity, any reference made herein to communications between the resource controller 106 and/or server 104 and the client application 102 may refer to communications between the resource controller 106 and/or server 104 and the CSCF associated with the client application 102. Moreover, SIP messages communicated between the resource controller 106 and/or server 104 and the client application 102 may be understood to be communicated with the CSCF associated with the client application 102.

Referring now to FIGS. 3 and 4, additional details regarding intelligently distributing traffic to a set of servers in a network will be provided according to embodiments of the present disclosure. In particular, FIG. 3 is a logical flow diagram illustrating aspects of a process for reporting an availability status of the resources 108 within the server 104. The routine 300 begins at operation 302, where the resource controller 106 determines the availability status of all resources within the server. For instance, in one embodiment, the resource controller 106 may periodically poll the resources 108 at the back end of the server 104. Further, the resource controller 106 may calculate a percentage of total resources available as well as a percentage of resources available for each type of resource. This may be done using a proprietary messaging method to report CPU and Memory Utilization. In further embodiments, a heartbeat may also be used to report availability.

From operation 302, the routine 300 proceeds to operation 304, where the resource controller 106 of the server 104 inserts the availability status of the resources into a message header. As described above, the message may be a SIP message including a SIP header. According to embodiments, the resource controller 106 or the server 104 may insert a resource availability status header including the availability status of the resources 108 as a new SIP header into the SIP message. The resource controller 106 can utilize the new resource availability status header to report the availability status of resources in any SIP messages sent back to the client applications 102, as shown in FIG. 1. In further embodiments as described in regard to FIG. 2, the resource controller 106 may send SIP messages including the resource availability status header containing the availability status of resources to a CSCF associated with the client application 102, such as the CSCF 202, which communicates with the client application 102. Within the resource status header, the available resources may be reported using a format that includes a resource capacity for each resource type, e.g., port, CPU, or memory. In one exemplary embodiment, the resource status header is populated with the percentage of resource available.

According to embodiments, the resource availability status header is only inserted into messages that are created in response to messages sent by the client application 102. Alternatively, the resource status header may be periodically inserted into messages sent from the servers 104 to the client application 102. In this way, the client application 102 may have more up-to-date resource availability status information.

From operation 304, the routine 300 proceeds to operation 306, where the resource controller 106 sends the message including the availability status of resources to the client application 102 in response to a request made by the client application. The message may be sent over the application layer. From operation 306, the routine 300 ends.

Referring now to FIG. 4, a logical flow diagram illustrates aspects of a process for automatically adjusting load distribution throughout the set of servers 104. Routine 400 begins at operation 402, where the client application 102 receives the message from the resource controller 106. As discussed above, the message from the resource controller 106 may be in response to a previous request made by the client application 102. Alternatively, the message sent to the client application 102 may not be prompted by a request from the client application 102. In addition, the client application 102 may periodically poll the servers 104 to determine the status of the resources 108. In this way, the client application 102 may know the availability at each server 104 and may distribute its requests according to the availability of the resources 108 at each server 104.

From operation 402, the routine 400 proceeds to operation 404, where the client application 102 may implement a load distribution function. The load distribution function is configured to analyze the availability of the resources 108 at each of the servers 104 in communication with the client application 102. Further, the load distribution function may then automatically adjust the load distribution to the set of servers 104 according to the availability of the resources 108. In this way, the client application 102 may request the services of the servers 104 in such a manner as to reduce the probability of a particular server being overloaded. As a result, the client application 102 may intelligently distribute the load throughout the set of servers 104.

In addition, the client application 102 may strip the resource availability status information included in the resource status header of the message sent by the server 104 to the client application 102 prior to forwarding the response from the server to other applications operating outside the secured environment. In this way, clients communicating with the client application 102 in a non-secure environment may not receive information pertaining to the set of servers 104.

From operation 404, the routine 400 proceeds to operation 406, where the client application 102 may send requests to the resource controllers 106 of the set of servers 104 according to load distribution configuration, such as an active/standby configuration or a load sharing configuration. In an active/standby configuration, the client application 102 may select an active server, such as the server 104A based on the results of the load distribution function. In this configuration, the client application 102 selects the server 104A having available resources as the active server, and the other available servers as standby servers, such as the servers 104B, 104C. According to various embodiments, the client application 102 may select the server 104A having the most available resources as the active server, while the client application 102 ranks the secondary or standby servers 104B, 104C in order of available resources. The client application 102 may then route traffic, which may be a request for services, to the active server 104A. The client application 102 may then receive a response to the request from the active server 104A, indicating the available resources 108A, 108B, 108C at the active server 104A. In various embodiments, the load distribution function of the client application 102 may send requests to the active server 104A as long as the availability of resources at the active server 104A does not fall below a threshold resource availability limit. The threshold resource availability limit may be the minimum amount of available resources at which the active server 104A may execute what is requested by the client application 102 without causing any delays or errors. If the client application 102 receives available resource status information from the server 104A that is below the threshold resource availability limits, the client application 102 may deactivate the active server 104A, and activate one of the standby servers, such as the server 104B. By doing so, the client application 102 may now start routing requests to the new active server 104B until the resource availability of the active server 104B falls below the threshold resource availability limit.

In a load sharing configuration, the load distribution function of the client application 102 may intelligently distribute the traffic amongst the servers 104 in such a manner that the traffic is redistributed amongst the servers 104 according to the available resources 108 at each server 104. In this way, the servers 104 having more available resources 108 may receive more resource intensive requests than servers having fewer available resources. It should be appreciated that the client application 102 may distribute traffic in any configuration utilizing the resource availability status information received from the servers 104. From operation 406, the routine 400 proceeds back to operation 402, where the routine 400 repeats until the client application 102 stops communicating with the servers 104.

Figure 5:
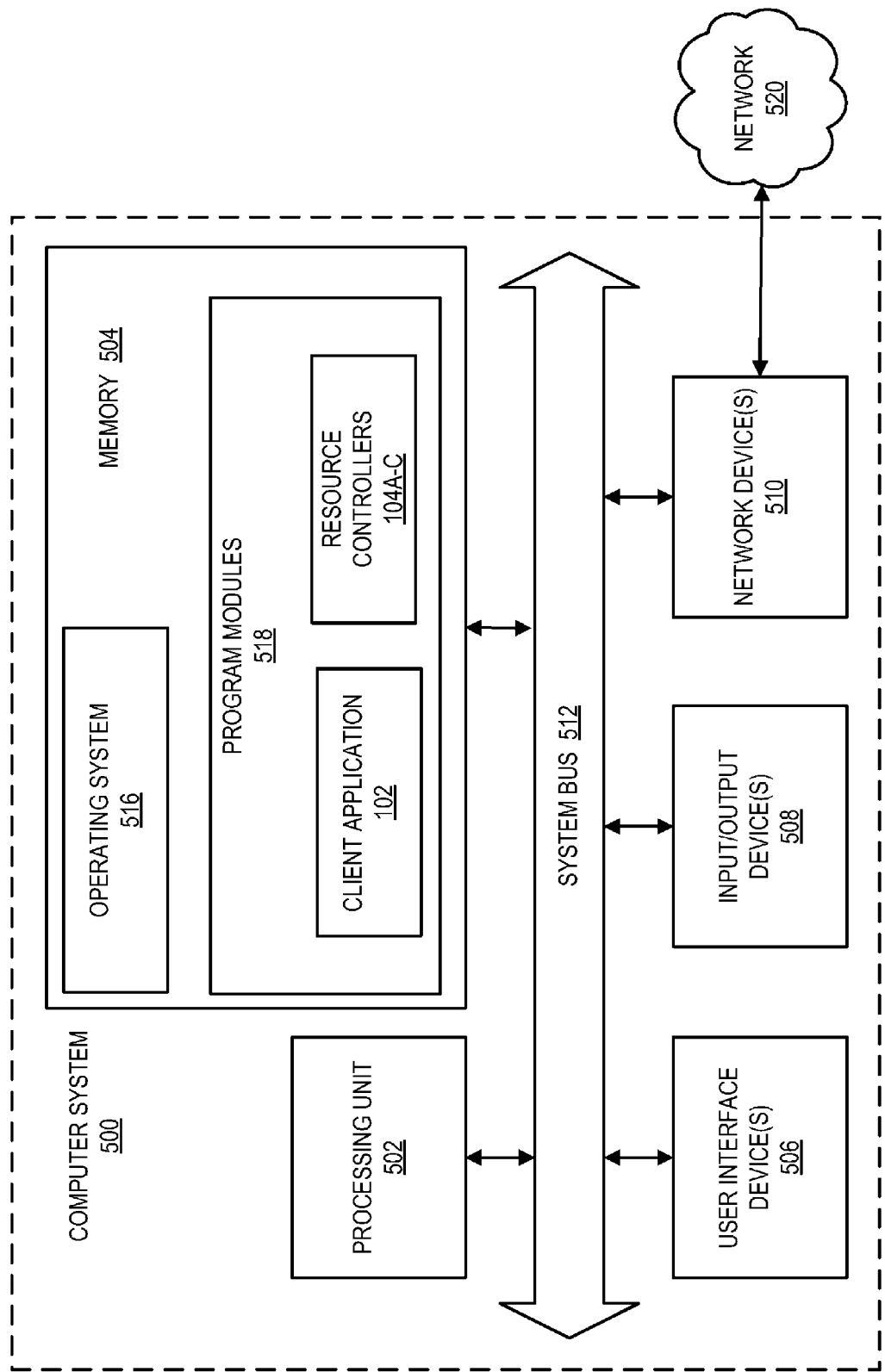
FIG. 5 is a block diagram illustrating an exemplary computer system configured to utilize the spare network capacity within the communications network, in accordance with various embodiments.

FIG. 5 is a block diagram illustrating a computer system 500 configured to report the availability status of resources within a server utilizing application layer messaging, in accordance with embodiments. Examples of the computer system 500 may include the servers 104A-104C and a computing device executing the client application 102. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 514 and one or more program modules 518, according to exemplary embodiments. Examples of operating systems, such as the operating system 514, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 518 include the client application 102 and the resource controller 106. Examples of the program modules 518 may include the resource controller 106, the call session control function 202, and the client application 102. In some embodiments, the program modules 518 are embodied in computer-readable media containing instructions that, when executed by the processing unit 502, performs embodiments of the routine 300 for reporting the availability status of resources associated with a server, and routine 400 for automatically adjusting load distribution throughout the set of servers 104, as described in greater detail above with respect to FIGS. 3 and 4, respectively.

According to embodiments, the program modules 518 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 108. Examples of the network devices 510 may include, but are not limited to, a modem, a radio frequency ("RF") or infrared ("IR") transceiver, a telephonic interface, a bridge, a router, or a network card. The network 520 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 520 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for reporting an availability status of resources associated with a plurality of servers in a network, the method comprising:
receiving, at a processor executing a client application, a message including a first availability status of the resources associated with each of the plurality of servers;
determining, at the processor executing the client application, the first availability status of the resources associated with each of the plurality of servers from the message;
based on the first availability status of the resources associated with each of the plurality of servers, designating, by the processor executing the client application, an active server from the plurality of servers and standby servers from the plurality of servers;
routing, by the processor executing the client application, traffic to the active server;
after designating the active server, determining, by the processor executing the client application, a second availability status of the resources associated with the active server;
determining, by the processor executing the client application, that the second availability status of the resources associated with the active server is below a threshold resource availability limit; and
in response to determining that the second availability status of the resources associated with the active server is below a threshold resource availability limit:
designating, by the processor executing the client application, a standby server from the standby servers as a new active server, and
rerouting, by the processor executing the client application, the traffic to the new active server.

2. The method of claim 1, wherein the message comprises a session initiation protocol message from a resource controller.

3. The method of claim 1, wherein the first availability status of the resources is included in a resource availability status header of the message, the resource availability status header comprising an indication of a resource capacity for each type of resource of the resources associated with each of the plurality of servers.

4. The method of claim 1, further comprising:
removing the first availability status of the resources from the message; and
after removing the first availability status of the resources from the message, sending the message to an external entity.

5. A system for reporting an availability status of resources associated with a plurality of servers in a network, the system comprising:
a processor; and
a memory coupled to the processor, the memory comprising instructions a client application that, when executed by the processor, causes the processor to perform a method comprising:
receiving a message including a first availability status of the resources associated with each of the plurality of servers,
determining the first availability status of the resources associated with each of the plurality of servers from the message,
based on the first availability status of the resources associated with each of the plurality of servers, designating an active server from the plurality of servers and standby servers from the plurality of servers,
routing traffic to the active server,
after designating the active server, determining a second availability status of the resources associated with the active server,
determining that the second availability status of the resources associated with the active server is below a threshold resource availability limit, and
in response to determining that the second availability status of the resources associated with the active server is below a threshold resource availability limit:
designating a standby server from the standby servers as a new active server, and
rerouting the traffic to the new active server.

6. The system of claim 5, wherein the message comprises a session initiation protocol message from a resource controller.

7. The system of claim 5, wherein the first availability status of the resources is included in a resource availability status header of the message, the resource availability status header comprising an indication of a resource capacity for each type of resource of the resources associated with each of the plurality of servers.

8. The system of claim 5, wherein the client application, when executed by the processor, causes the processor to perform a further method comprising:
removing the first availability status of the resources from the message; and
after removing the first availability status of the resources from the message, sending the message to an external entity.

9. A non-transitory computer-readable medium for reporting an availability status of resources associated with a server in a network, having a client application stored thereon that, when executed by a computer, causes the computer to perform a method comprising:
receiving a message including a first availability status of the resources associated with each of the plurality of servers;
determining the first availability status of the resources associated with each of the plurality of servers from the message;
based on the first availability status of the resources associated with each of the plurality of servers, designating an active server from the plurality of servers and standby servers from the plurality of servers;
routing traffic to the active server;
after designating the active server, determining a second availability status of the resources associated with the active server;
determining that the second availability status of the resources associated with the active server is below a threshold resource availability limit; and
in response to determining that the second availability status of the resources associated with the active server is below a threshold resource availability limit:
designating a standby server from the standby servers as a new active server, and
rerouting the traffic to the new active server.

10. The non-transitory computer-readable medium of claim 9, wherein the message comprises a session initiation protocol message from a resource controller.

11. The non-transitory computer-readable medium of claim 9, wherein the client application, when executed by the computer, causes the computer to perform a further method comprising:
   removing the first availability status of the resources from the message; and
   after removing the first availability status of the resources from the message, sending the message to an external entity.

* * * * *

UNITED STATES PATENT AND TRADEMARK OFFICE
CERTIFICATE OF CORRECTION

PATENT NO. : 8,260,930 B2
APPLICATION NO. : 12/632179
DATED : September 4, 2012
INVENTOR(S) : Arshad Khan et al.

Page 1 of 1

It is certified that error appears in the above-identified patent and that said Letters Patent is hereby corrected as shown below:

In the Claims:

Column 9, Line 57, please delete "instructions".

Signed and Sealed this
Twenty-third Day of April, 2013

Teresa Stanek Rea
*Acting Director of the United States Patent and Trademark Office*